US 9,245,172 B2

(12) United States Patent
Koseki et al.

(10) Patent No.: US 9,245,172 B2
(45) Date of Patent: Jan. 26, 2016

(54) AUTHENTICATION APPARATUS, AUTHENTICATION METHOD, AND NON-TRANSITORY COMPUTER READABLE MEDIUM

(71) Applicant: FUJI XEROX CO., LTD., Tokyo (JP)

(72) Inventors: Tomitsugu Koseki, Kanagawa (JP);
Yuichi Kawata, Kanagawa (JP);
Nobuaki Suzuki, Kanagawa (JP);
Hideki Yamasaki, Kanagawa (JP);
Yoshifumi Bando, Kanagawa (JP);
Kensuke Okamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 13/954,292

(22) Filed: Jul. 30, 2013

(65) Prior Publication Data
US 2014/0241593 A1 Aug. 28, 2014

(30) Foreign Application Priority Data

Feb. 22, 2013 (JP) .................................. 2013-032806

(51) Int. Cl.
*G06K 9/00* (2006.01)
(52) U.S. Cl.
CPC .................................. *G06K 9/00221* (2013.01)
(58) Field of Classification Search
CPC ..................................................... G06K 9/00
USPC ........................................................ 382/118
See application file for complete search history.

(56) References Cited

U.S. PATENT DOCUMENTS

| | | | |
|---|---|---|---|
| 2004/0165754 A1* | 8/2004 | Tabata | 382/118 |
| 2010/0316265 A1* | 12/2010 | Nakanowatari et al. | 382/118 |
| 2014/0016873 A1* | 1/2014 | Kodesh et al. | 382/218 |

FOREIGN PATENT DOCUMENTS

| | | | |
|---|---|---|---|
| JP | 2004-126813 A | | 4/2004 |
| JP | 2005-115486 A | | 4/2005 |
| JP | 2008-217510 A | | 9/2008 |
| JP | 2010231277 A | * | 10/2010 |
| WO | WO 2012127577 A1 | * | 9/2012 |

OTHER PUBLICATIONS

Face Recognition for Look-Alikes: A Preliminary Study. Hemank Lamba, Ankit Sarkar, Mayank Vatsa, Richa Singh and Afzel Noore. 2011.*

\* cited by examiner

*Primary Examiner* — Stephen R Koziol
*Assistant Examiner* — Delomia L Gilliard
(74) *Attorney, Agent, or Firm* — Sughrue Mion, PLLC (57) ABSTRACT

An authentication apparatus includes a feature acquiring unit that acquires a feature of an authentication target; an extracting unit that extracts one or more registered persons having features similar to the acquired feature; a determining unit that determines whether any registered person having a feature similar to the feature of at least one extracted registered person exits in the registered persons; a first identifying unit that, if the determination is negative, identifies the registered person having the feature having a highest degree of similarity with the acquired feature as the authentication target; a specific information accepting unit that accepts information specific to the authentication target; and a second identifying unit that, if the determination is affirmative and the accepted specific information coincides with the information specific to any extracted registered person, identifies the registered person having the coinciding specific information as the authentication target.

13 Claims, 7 Drawing Sheets

| No. | ID | SIMILARITY FLAG | FEATURE OF FACE |
|---|---|---|---|
| 0 | ABC | 0 | p(0) |
| 1 | XYZ | 0 | p(1) |
| 2 | DDD | 0 | p(2) |
| 3 | EEE | 0 | p(3) |
| : | : | : | : |
| n | | | |

FIG. 3B

| No. | ID | DEGREE OF SIMILARITY | PRESENCE OF SIMILARITY |
|---|---|---|---|
| 0 | ABC | 60 | × |
| 1 | XYZ | 75 | ○ |
| 2 | DDD | 30 | × |
| 3 | EEE | 45 | × |
| : | : | : | : |
| n | | — | — |

FIG. 3C

| No. | ID | SIMILARITY FLAG | FEATURE OF FACE |
|---|---|---|---|
| 0 | ABC | 0 | p(0) |
| 1 | XYZ | 1 | p(1) |
| 2 | DDD | 0 | p(2) |
| 3 | EEE | 0 | p(3) |
| : | : | : | : |
| n | ZZZ | 1 | p(n) |

FIG. 4A

| No. | ID | SIMILARITY FLAG | FEATURE OF FACE |
|---|---|---|---|
| 0 | ABC | 0 | p(0) |
| 1 | XYZ | 1 | p(1) |
| 2 | DDD | 0 | p(2) |
| 3 | EEE | 0 | p(3) |
| : | : | : | : |
| n | ZZZ | 1 | p(n) |

FIG. 4B

| No. | ID | DEGREE OF SIMILARITY | PRESENCE OF SIMILARITY |
|---|---|---|---|
| 0 | ABC | 30 | × |
| 1 | XYZ | 25 | × |
| 2 | DDD | 75 | ○ |
| 3 | EEE | 85 | ○ |
| : | : | : | : |
| n | ZZZ | 45 | × |

FIG. 5A

| No. | ID | SIMILARITY FLAG | FEATURE OF FACE |
|---|---|---|---|
| 0 | ABC | 0 | p(0) |
| 1 | XYZ | 1 | p(1) |
| 2 | DDD | 0 | p(2) |
| 3 | EEE | 0 | p(3) |
| ⋮ | ⋮ | ⋮ | ⋮ |
| n | ZZZ | 1 | p(n) |

FIG. 5B

| No. | ID | DEGREE OF SIMILARITY | CANDIDATE |
|---|---|---|---|
| 0 | ABC | 25 | × |
| 1 | XYZ | 80 | ○ |
| 2 | DDD | 75 | ○ |
| 3 | EEE | 40 | × |
| ⋮ | ⋮ | ⋮ | ⋮ |
| n | ZZZ | 60 | × |

FIG. 6

Fig. 1
AUTHENTICATION APPARATUS, AUTHENTICATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-032806 filed Feb. 22, 2013.

BACKGROUND

1. Technical Field

The present invention relates to an authentication apparatus, an authentication method, and a non-transitory computer readable medium.

2. Summary

According to an aspect of the invention, there is provided an authentication apparatus including a feature acquiring unit that acquires a feature of at least part of a body of an authentication target; an extracting unit that compares a feature of at least part of a body of each registered person that is stored in advance with the feature acquired by the feature acquiring unit to extract one or more registered persons having degrees of similarity between the above features, which exceed a predetermined first threshold value; a determining unit that determines whether any registered person having the feature having the degree of similarity with the feature of at least one registered person extracted by the extracting unit, which exceeds a predetermined second threshold value, exits in the registered persons stored in advance; a first identifying unit that, if the determination by the determining unit is negative, identifies the registered person having the feature having a highest degree of similarity with the feature acquired by the feature acquiring unit, among the registered persons extracted by the extracting unit, as the authentication target; a specific information accepting unit that accepts information specific to the authentication target, different from the feature acquired by the feature acquiring unit; and a second identifying unit that, if the determination by the determining unit is affirmative and the information specific to the authentication target accepted by the specific information accepting unit coincides with the information that is specific to any registered person extracted by the extracting unit and that is stored in advance, identifies the registered person having the coinciding specific information as the authentication target.

BRIEF DESCRIPTION OF THE DRAWINGS

Exemplary embodiments of the present invention will be described in detail based on the following figures, wherein:

FIGS. 3A to 3C are tables illustrating examples of the information about registered persons stored in a storage unit.

FIGS. 4A and 4B are tables for describing the authentication in a case in which a similarity presence determining unit determines that no other registered person similar to the registered persons extracted by an extracting unit exists.

FIGS. 5A and 5B are tables for describing the authentication in a case in which the similarity presence determining unit determines that any other registered person similar to the registered persons extracted by the extracting unit exists.

DETAILED DESCRIPTION

Before describing exemplary embodiments of the present invention, authentication will now be simply described. The authentication includes 1-to-1 authentication and 1-to-N authentication.

In the 1-to-1 authentication, a person to be authenticated (hereinafter referred to as an authentication target) inputs identification information, such as an identifier (ID), used to identify a person and a feature, such as biological information, into an authentication apparatus and the authentication apparatus compares the input feature with the feature associated with the input identification information, among the features of registered persons stored in advance, to identify the authentication target.

In contrast, in the 1-to-N authentication, the authentication target inputs a feature, such as the biological information, into the authentication apparatus and the authentication apparatus sequentially compares the input feature with the features of all the registered persons stored in advance to identify the authentication target.

As described above, the input of the identification information, such as the ID, is not basically required in the 1-to-N authentication, unlike the 1-to-1 authentication. However, a state in which it is necessary to switch the 1-to-N authentication to 1-to-1 authentication may occur due to the problem of the recognition accuracy of the feature.

The degree of similarity between the feature of the authentication target and the feature of each registered person stored in advance is not necessarily constant in the comparison of the features. For example, in face authentication, the degree of similarity is varied with variation factors including the effect of surrounding environment (ambient light, the orientation of the face, etc.) and the effect of the appearance (the color of the face, decoration, makeup, etc.) during the authentication. Accordingly, a threshold value is set so as to permit the variation in the degree of similarity in the authentication and the registered person is identified as the original if the degree of similarity exceeds the threshold value.

When the 1-to-N authentication is performed on the basis of the feature of the authentication target with the variation in the degree of similarity permitted, multiple registered persons may be extracted as candidates for the original. In such a case, since it is not possible to identify the original only with the feature of the authentication target, it is necessary to request input of the identification information to switch the 1-to-N authentication to the 1-to-1 authentication.

The multiple registered persons are extracted as the candidates of the original in the 1-to-N authentication because of the following two reasons. In the following description, the registered person who is the original is the authentication target himself/herself, among the registered persons (the candidates) having the features the degrees of similarity of which with the feature of the authentication target exceed the threshold value. The registered persons who are others are persons other than the authentication target, among the candidates.

<First Event>

Due to the variation factors in the authentication, the degree of similarity with the registered person who is the original is reduced while the degrees of similarity with the registered persons who are others are increased as the result of the comparison between the feature of the authentication target and the features of the registered persons, which may result in multiple candidates.

<Second Event>

When any of the registered persons having similar relationship, such as relatives the features of which are originally similar to each other, is the authentication target, the registered persons who are others having the similar relationship may be extracted as the candidates, in addition to the registered person who is the original.

In the first event, since the degree of similarity with the registered person who is the original is higher than the degrees of similarity of the registered persons who are others although both the degree of similarity with the registered person who is the original and the degrees of similarity with the registered persons who are others exceed the threshold value, it is possible to identify the candidate having the highest degree of similarity, among the candidates, as the original.

In contrast, in the second event, the degree of similarity between the authentication target and the registered person who is the original is not necessarily higher than the degrees of similarity between the authentication target and the registered persons who are others depending on the magnitude of the variation in the authentication and the degrees of similarity between the registered person who is the original and the registered persons who are others.

As described above, even when the multiple candidates are extracted in the 1-to-N authentication, it is not necessary to switch the 1-to-N authentication to the 1-to-1 authentication in the first event.

The exemplary embodiments of the present invention will herein be described with reference to the attached drawings. An authentication apparatus according to an exemplary embodiment of the present invention does not request input of the identification information about the authentication target in the first event but requests input of the identification information about the authentication target in the second event when multiple candidates are extracted in the 1-to-N authentication.

Figure 1:
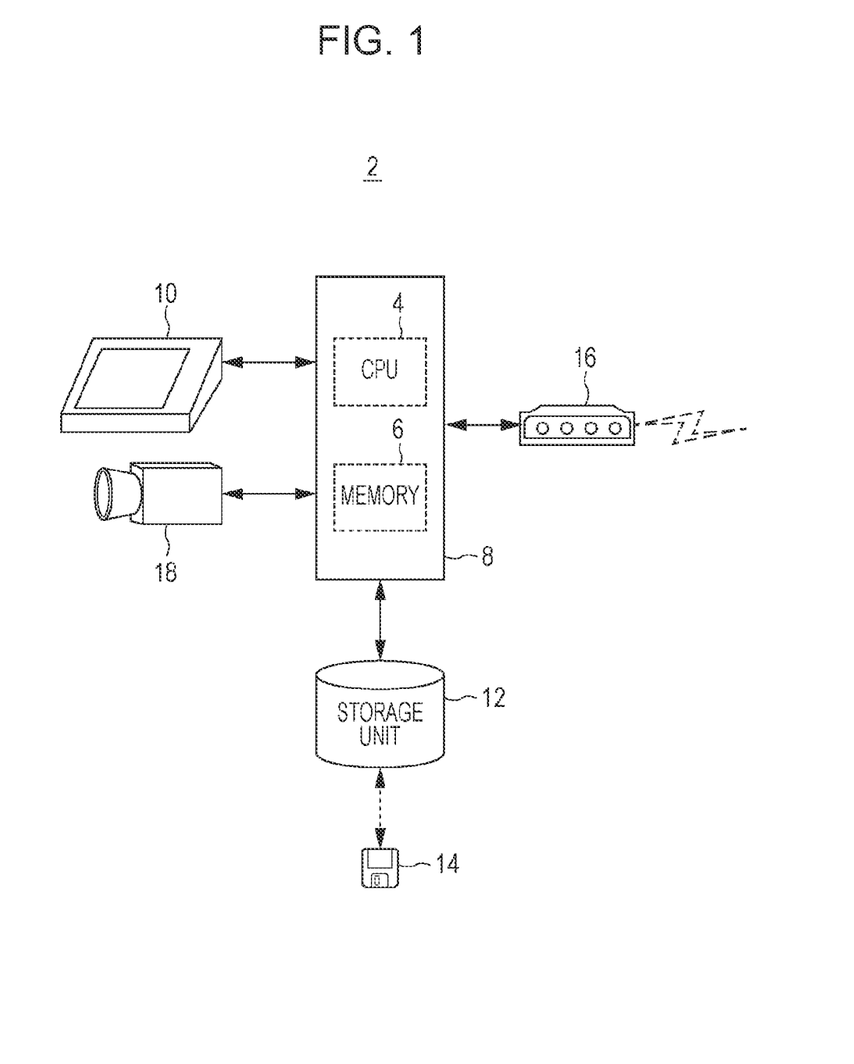
FIG. 1 is a schematic view illustrating an exemplary hardware configuration of an authentication apparatus according to an exemplary embodiment of the present invention.

FIG. 1 is a schematic view illustrating an exemplary hardware configuration of an authentication apparatus 2 according to an exemplary embodiment of the present invention. Referring to FIG. 1, the authentication apparatus 2 includes a main body 8 including a central processing unit (CPU) 4, a memory 6, etc., a user interface (UI) unit 10, a storage unit 12, a recording medium 14, a communication unit 16, and a biological information acquiring unit 18. The authentication apparatus 2 includes components serving as a computer.

The CPU 4 executes processing based on programs stored in the memory 6. The storage unit 12 is, for example, a built-in hard disk drive (HDD). The recording medium 14 is, for example, a compact disc (CD), a flexible disk (FD), or an external HDD. The CPU 4 may execute programs stored in the storage unit 12 or the recording medium 14.

The UI unit 10 has functions of an input apparatus and an output apparatus, like a touch panel. The authentication target inputs the identification information, such as his/her ID, into the authentication apparatus 2 with the UI unit 10. A card reader apparatus, such as an integrated circuit (IC) card or a magnetic card, which reads out data in a storage medium may be provided as the UI unit 10 and the identification information about the authentication target stored in the storage medium may be read out.

The communication unit 16 is, for example, a data line termination apparatus, which communicates with another apparatus via a communication line, such as a local area network (LAN) or the Internet. It is assumed in the present exemplary embodiment that information acquired from the authentication target and information about the registered persons to be compared are stored in the storage unit 12. However, the information acquired from the authentication target and the information about the registered persons to be compared are not limitedly stored in the storage unit 12 in the authentication apparatus 2 and the information about the registered persons may be stored in an apparatus different from the authentication apparatus 2. For example, the information about the registered persons may be acquired through the communication line via the communication unit 16.

The biological information acquiring unit 18 acquires the feature of at least part of a body, such as the biological information. The biological information acquiring unit 18 is, for example, a Charge Coupled Device (CCD) camera, which captures an image of the face of a user in the present exemplary embodiment. Although the biological information acquiring unit 18 is described as a unit that acquires the feature of the face of the user in the present exemplary embodiment, the biological information acquiring unit 18 may acquire another feature, such the iris, the fingerprint, or the vein.

Figure 2:
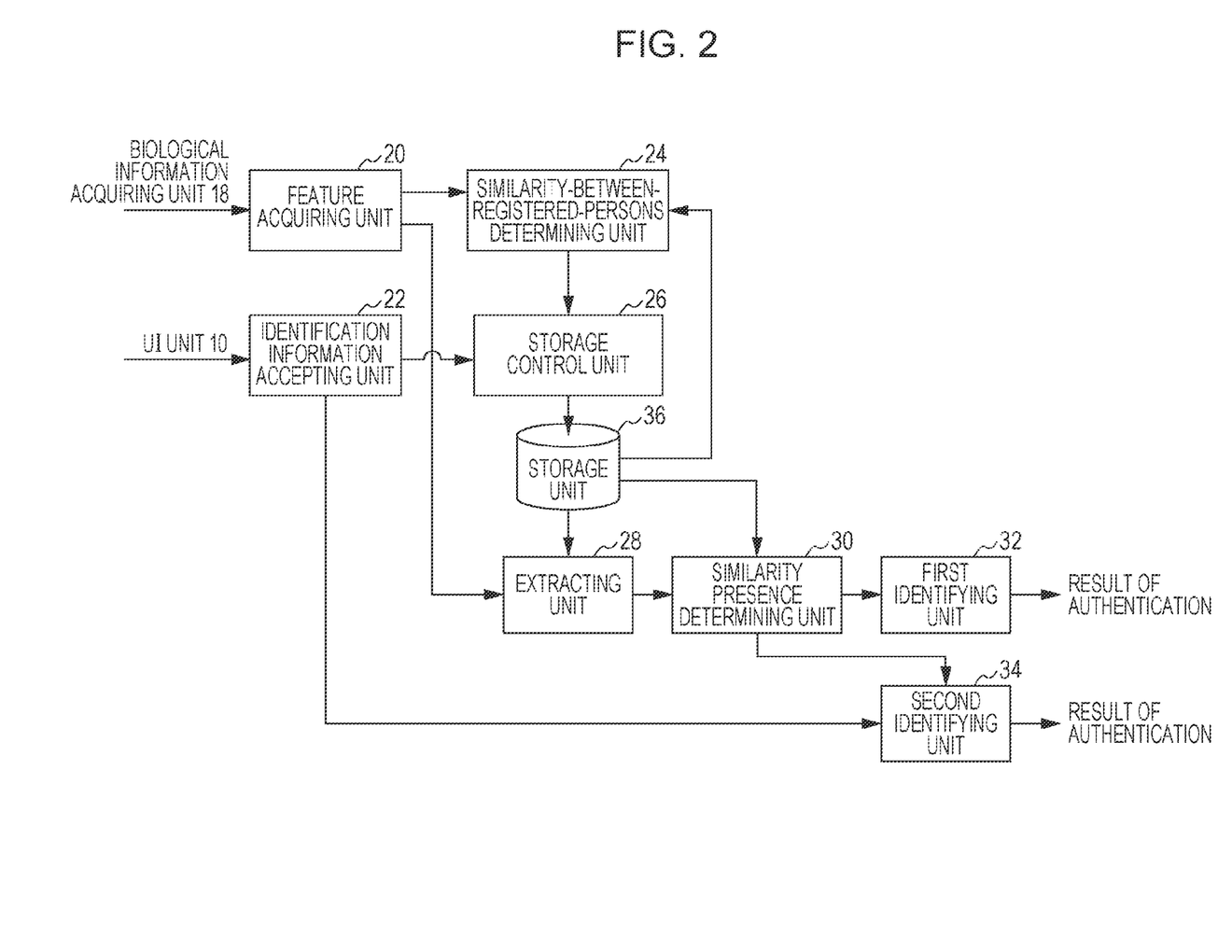
FIG. 2 is a block diagram illustrating an exemplary functional configuration of the authentication apparatus according to the exemplary embodiment of the present invention.

FIG. 2 is a block diagram illustrating an exemplary functional configuration of the authentication apparatus 2, which is realized by the programs that are executed.

Referring to FIG. 2, the authentication apparatus 2 includes a feature acquiring unit 20, an identification information accepting unit 22, a similarity-between-registered-persons determining unit 24, a storage control unit 26, an extracting unit 28, a similarity presence determining unit 30, a first identifying unit 32, a second identifying unit 34, and a storage unit 36.

The feature acquiring unit 20 acquires the feature of at least part of the body of the user. In the present exemplary embodiment, the feature acquiring unit 20 extracts the feature of the face of the user, who is a subject, from the image of the face captured by the biological information acquiring unit 18 to acquire the feature. Specifically, the feature acquiring unit 20 acquires the feature of a person to be registered (hereinafter referred to as a registration target) in the registration of the user and acquires the feature of the authentication target in the authentication of the authentication target. In addition, in the registration of the user, the acquired feature is stored in the storage unit 36 under the control of the storage control unit 26 described below. In the authentication of the authentication target, the acquired feature is compared with the features of the registered persons stored in the storage unit 36. The feature acquiring unit 20 does not limitedly acquire the feature from the biological information acquiring unit 18 and may acquire the feature via, for example, the communication line from an apparatus different from the authentication apparatus 2.

The identification information accepting unit 22 accepts the identification information about the user. In the present exemplary embodiment, the identification information accepting unit 22 accepts the identification information about the user, such as the ID of the user, input with the UI unit 10. Specifically, the identification information accepting unit 22 accepts the identification information about the registration target in the registration of the user and accepts the identification information about the authentication target in the 1-to-1 authentication of the authentication target. In addition, in the registration of the user, the accepted identification information is stored in the storage unit 36 under the control of the storage control unit 26 described below. In the 1-to-1 authentication of the authentication target, the accepted identification information is used to identify the authentication target himself/herself, among the registered persons the information about which is stored in the storage unit 36. The identification information accepting unit 22 may accept the identification information via, for example, the communication line from an apparatus different from the authentication apparatus 2.

The similarity-between-registered-persons determining unit 24 determines whether the feature of the registration target acquired by the feature acquiring unit 20 is similar to the features of the registered persons which have been already registered in the registration of the user. Specifically, the similarity-between-registered-persons determining unit 24 compares the feature of the registration target acquired by the feature acquiring unit 20 with the feature of each registered person stored in the storage unit 36 to determine whether the degree of similarity between the features exceeds a predetermined threshold value TH1.

The degree of similarity is calculated, for example, in the following manner. The following manner is only an example and the degree of similarity may be calculated by another known method, such as a method disclosed in Japanese Unexamined Patent Application Publication No. 2008-217510.

For example, the feature acquiring unit 20 extracts, for example, the positional relationship between the eyes, the nose, and the mouth or the outlines thereof as feature parameters on the basis of the image of the face supplied from the biological information acquiring unit 18 to compare the extracted feature parameters with the feature parameters of the registered persons stored in the storage unit 36 in advance by pattern matching.

In the pattern matching, the difference in each feature parameter between the respective areas is first calculated. For example, when a two-dimensional image of luminance information is used as the feature parameter of each area, the absolute value of the difference between the two-dimensional pixel values is accumulated as the difference. When a vector is used as the feature parameter of the positional relationship between the respective areas, the difference in the angle of the vector and the difference in the distance of the vector are calculated. Next, each difference that is calculated is weighted to be digitized. For example, when the similarity of the eyes is given higher importance than that of the similarity of the mouth, the weight of the difference between the feature parameter of the eyes is increased. Then, the sum of the weighted values calculated for the respective areas is used as the score of the degree of similarity.

The storage control unit 26 controls the storage so that the identification information accepted by the identification information accepting unit 22, the feature of the registration target acquired by the feature acquiring unit 20, and information about the result of the determination by the similarity-between-registered-persons determining unit 24 are stored in the storage unit 36 in association with each other as the information about the registered person. A specific example of the information about the registered person to be stored in the storage unit 36 will be described below with reference to the drawings.

The extracting unit 28 compares the feature of at least part of the body of each registered person, which is stored in advance, with the feature of the authentication target acquired by the feature acquiring unit 20 to extract the registered persons having the degrees of similarity between the above features, which exceed a predetermined threshold value TH2. Specifically, the extracting unit 28 sequentially compares the feature of the authentication target acquired by the feature acquiring unit 20 with the features of the respective registered persons stored in the storage unit 36 to extract all the registered persons having the features having the degrees of similarity exceeding the predetermined threshold value TH2.

The similarity presence determining unit 30 determines whether any registered person having the feature having the degree of similarity with the feature of at least one registered person extracted by the extracting unit 28, which exceeds the predetermined threshold value TH1, exists in all the registered persons the information about which is stored in the storage unit 36. In the present exemplary embodiment, the similarity presence determining unit 30 refers to the information about the result of the determination by the similarity-between-registered-persons determining unit 24, stored in the storage unit 36, to determine whether any registered person determined to be similar to the registered persons extracted by the extracting unit 28 exists in all the registered persons the identification information about which is stored in the storage unit 36.

If the similarity presence determining unit 30 determines that any registered person determined to be similar to the registered persons extracted by the extracting unit 28 exists, for example, an indication prompting the authentication target to input the identification information is displayed in the UI unit 10.

The first identifying unit 32 identifies the registered person having the feature having the highest degree of similarity with the feature of the authentication target acquired by the feature acquiring unit 20, among the registered persons extracted by the extracting unit 28, as the authentication target. The identification of the registered person by the first identifying unit 32 is performed if the similarity presence determining unit 30 determines that no other registered person similar to the registered persons extracted by the extracting unit 28 exists. Even when the multiple registered persons are extracted by the extracting unit 28 as the candidates in the above manner, one registered person is identified. The authentication target is authenticated as the registered person himself/herself that is identified.

If the identification information about the authentication target accepted by the identification information accepting unit 22 coincides with the identification information about any registered person extracted by the extracting unit 28, which is stored in the storage unit 36, the second identifying unit 34 identifies the registered person having the coinciding information as the authentication target. The identification of the registered person by the second identifying unit 34 is performed if the similarity presence determining unit 30 determines that any registered person similar to the registered persons extracted by the extracting unit 28 exists. The registered person is identified by using the identification information when the similarity presence determining unit 30 determines that any registered person similar to the registered persons extracted by the extracting unit 28 exists. The authentication target is authenticated as the registered person himself/herself that is identified.

The registration of the user will now be described using specific examples.

Figure 3A:
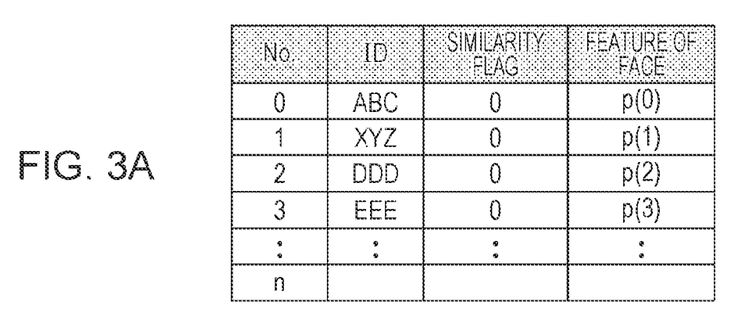
FIG. 3A illustrates an example of a database before a registered person is added.
Figure 3B:
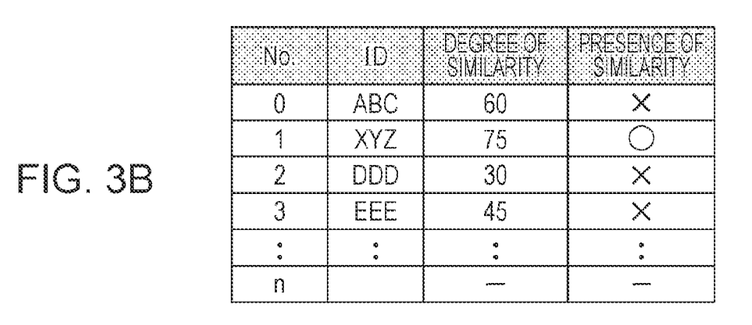
FIG. 3B illustrates an example of the relationship in the degree of similarity between a registration target and the registered persons.
Figure 3C:
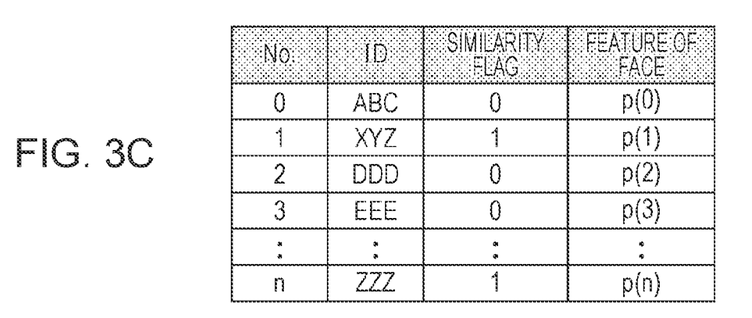
FIG. 3C illustrates an example of the database after the registered person is added.

FIGS. 3A to 3C are tables illustrating examples of the information about the registered persons stored in the storage unit 36. FIG. 3A illustrates an example of a database before a registered person is added. FIG. 3B illustrates an example of the relationship in the degree of similarity between the registration target and the registered persons. FIG. 3C illustrates an example of the database after the registered person is added.

In the examples illustrated in FIGS. 3A to 3C, the user the identification information about which, that is, the ID of which is "ZZZ" is registered as an n-th registered person. In the registration of a new user, the identification information accepting unit 22 accepts "ZZZ", which is the ID of the registration target, and the feature acquiring unit 20 acquires a feature p(n) of the registration target in the above manner.

The similarity-between-registered-persons determining unit 24 sequentially compares the acquired feature p(n) of "ZZZ" with features p(0) to p(n−1) that have been already stored in the database to calculate the degrees of similarity. If the degree of similarity exceeds the predetermined threshold value TH1, it is determined that the feature p(n) is similar to the compared feature. In the example in FIG. 3B, the threshold value TH1 is set to 70 and the registered person the ID of which is "XYZ" is determined to be the similar registered person.

The storage control unit 26 stores the ID of the registration target, the feature, and the information about the result of the determination by the similarity-between-registered-persons determining unit 24 in the database in association with each other. In the example in FIG. 3C, the value of a flag indicating that the similar registered person exists is stored as the information about the result of the determination. Since the registered person the ID of which is "ZZZ" is determined to be similar to the registered person the ID of which is "XYZ", the flag has a value of "one" for both of the registered persons in the example in FIG. 3C. Also when multiple registered persons similar to the registration target exist, the value of the flag is set to "one" for all the registered persons having the similar relationship.

The authentication of the user will now be described using specific examples.

Figure 4A:
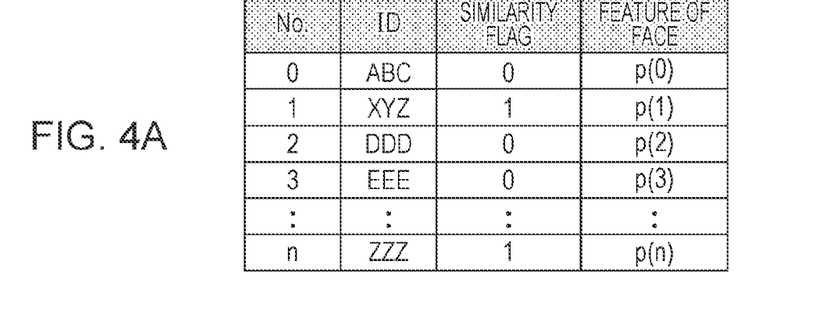
FIG. 4A illustrates an example of the database of the information about the registered persons stored in advance and FIG. 4B illustrates an example of the relationship in the degree of similarity between an authentication target and the registered persons.
Figure 4B:
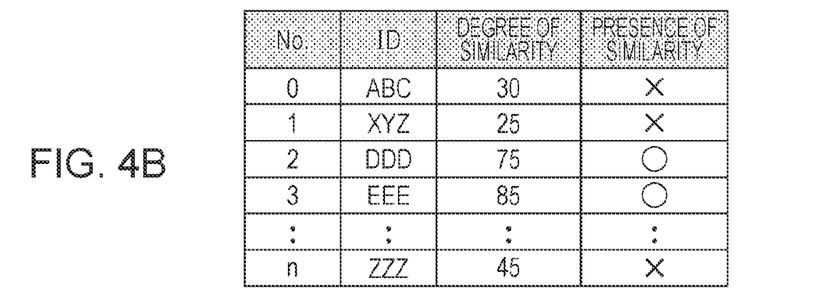

FIGS. 4A and 4B are tables for describing the authentication in a case in which the similarity presence determining unit 30 determines that no other registered person similar to the registered persons extracted by the extracting unit 28 exists. FIG. 4A illustrates an example of the database of the information about the registered persons stored in advance. FIG. 4B illustrates an example of the relationship in the degree of similarity between the authentication target and the registered persons.

In the authentication of the user, the extracting unit 28 sequentially compares the feature of the authentication target acquired by the feature acquiring unit 20 with the features p(0) to p(n) of the respective registered persons illustrated in FIG. 4A to extract the registered persons having the features having the degrees of similarity exceeding the predetermined threshold value TH2 from the database. In the example in FIG. 4B, the threshold value TH2 is set to 70 and the registered person the ID of which is "DDD" and the registered person the ID of which is "EEE" are extracted as the registered persons similar to the authentication target.

As illustrated in FIG. 4A, the registered person the ID of which is "DDD" and the registered person the ID of which is "EEE" have a value of "zero" for the above flag. Accordingly, the similarity presence determining unit 30 determines that no other registered person similar to the registered persons extracted by the extracting unit 28 exists and the identification of the registered person by the first identifying unit 32 is performed. In the example in FIG. 4B, the first identifying unit 32 identifies the registered person the ID of which is "EEE" and which has the highest degree of similarity, in the registered person the ID of which is "DDD" and the registered person the ID of which is "EEE", as the authentication target.

Figure 5A:
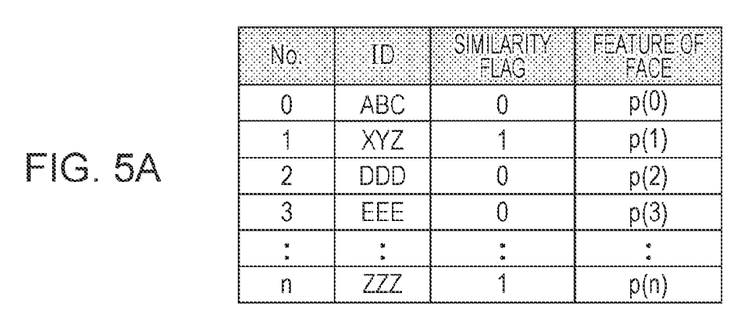
FIG. 5A illustrates an example of the database of the information about the registered persons stored in advance and FIG. 5B illustrates an example of the relationship in the degree of similarity between the authentication target and the registered persons.
Figure 5B:
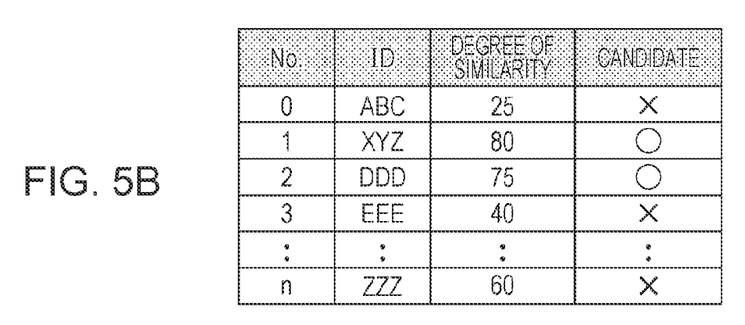

FIGS. 5A and 5B are tables for describing the authentication in a case in which the similarity presence determining unit 30 determines that any other registered person similar to the registered persons extracted by the extracting unit 28 exists. FIG. 5A illustrates an example of the database of the information about the registered persons stored in advance. FIG. 5B illustrates an example of the relationship in the degree of similarity between the authentication target and the registered persons.

In the authentication of the user, the extracting unit 28 sequentially compares the feature of the authentication target acquired by the feature acquiring unit 20 with the features p(0) to p(n) of the respective registered persons illustrated in FIG. 5A to extract the registered persons having the features having the degrees of similarity exceeding the predetermined threshold value TH2 from the database. In the example in FIG. 5B, the threshold value TH2 is set to 70 and the registered person the ID of which is "XYZ" and the registered person the ID of which is "DDD" are extracted as the registered persons similar to the authentication target.

As illustrated in FIG. 5A, the registered person the ID of which is "XYZ" has a value of "one" for the above flag. Accordingly, the similarity presence determining unit 30 determines that another registered person (the registered person the ID of which is "ZZZ" in the example in FIG. 5A) similar to the registered person (the registered person the ID of which is "XYZ" in the example in FIG. 5A) extracted by the extracting unit 28 exists and the identification of the registered person by the second identifying unit 34 is performed. The authentication apparatus 2 requests the authentication target to input the identification information. If the identification information about the authentication target accepted by the identification information accepting unit 22 coincides with the identification information about any registered person (the registered person the ID of which is "XYZ" or the registered person the ID of which is "DDD" in the example in FIG. 5B) extracted by the extracting unit 28, the second identifying unit 34 identifies the registered person having the coinciding identification information as the authentication target. For example, when the ID accepted by the identification information accepting unit 22 is "XYZ", the second identifying unit 34 identifies the registered person the ID of which is "XYZ" as the authentication target. For example, when the ID accepted by the identification information accepting unit 22 is "DDD", the second identifying unit 34 identifies the registered person the ID of which is "DDD" as the authentication target.

An operation to register the user by the authentication apparatus 2 will now be described.

Figure 6:
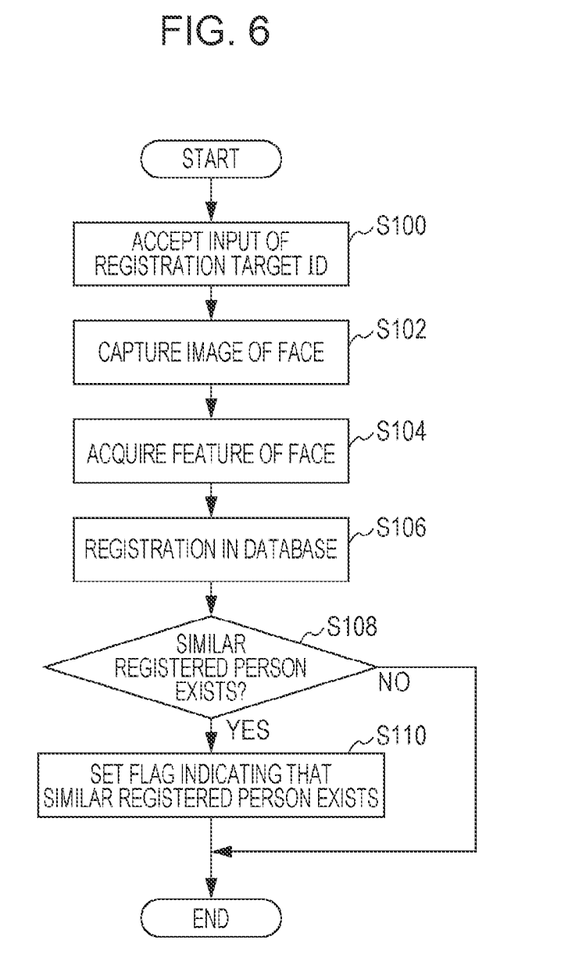
FIG. 6 is a flowchart illustrating an example of a process of registering a user by the authentication apparatus according to the exemplary embodiment of the present invention.

FIG. 6 is a flowchart illustrating an example of a process of registering the user by the authentication apparatus 2.

Referring to FIG. 6, in Step S100, the identification information accepting unit 22 accepts the ID of the registration target, which is input via the UI unit 10.

In Step S102, an image of the face of the registration target is captured by the biological information acquiring unit 18 composed of a camera.

In Step S104, the feature acquiring unit 20 acquires the feature of the face of the registration target on the basis of the image captured in Step S102.

In Step S106, the storage control unit 26 registers the ID accepted in Step S100 and the feature acquired in Step S104 in a database in association with each other. In Step S108, the similarity-between-registered-persons determining unit 24 determines whether any registered person similar to the registration target exists. If any registered person similar to the registration target exists (YES in Step S108), in Step S110, the storage control unit 26 sets a flag indicating that the registered person similar to the registration target exists and performs the registration. If no registered person similar to the registration target exists (NO in Step S108), the storage control unit 26 performs the registration without setting the flag indicating that the registered person similar to the registration target exists.

An operation to authenticate the user by the authentication apparatus 2 will now be described.

Figure 7:
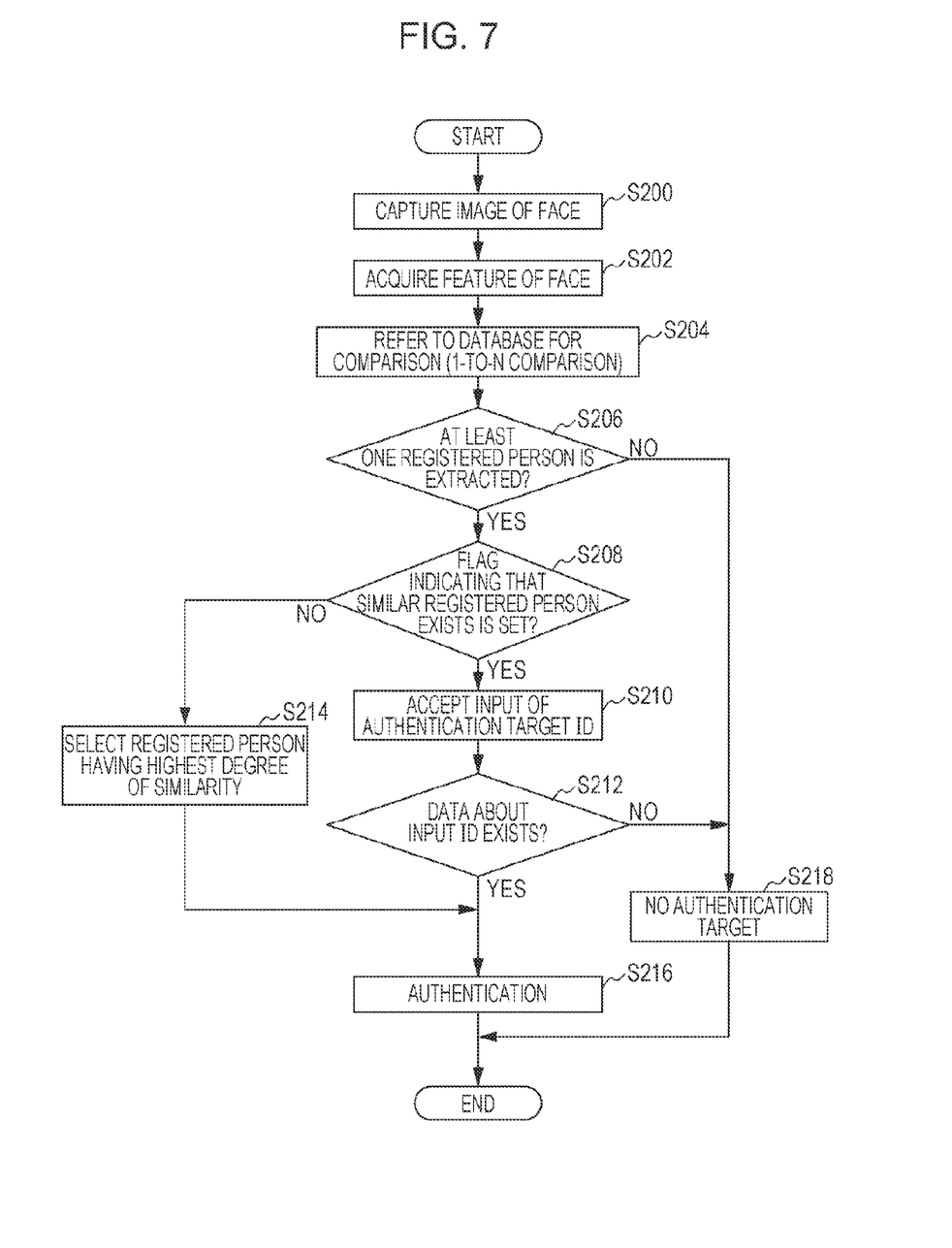
FIG. 7 is a flowchart illustrating an example of a process of authenticating the user by the authentication apparatus according to the exemplary embodiment of the present invention.

FIG. 7 is a flowchart illustrating an example of a process of authenticating the user by the authentication apparatus 2.

Referring to FIG. 7, in Step S200, an image of the face of the authentication target is captured by the biological information acquiring unit 18 composed of a camera.

In Step S202, the feature acquiring unit 20 acquires the feature of the face of the authentication target on the basis of the image captured in Step S200.

In Step S204, the extracting unit 28 sequentially compares the feature of the authentication target acquired in Step S202 with the features of the registered persons registered in the database to extract the registered persons having the degrees of similarity between the features, which exceed the predetermined threshold value TH2. In Step S206, it is determined whether at least one registered person is extracted. If at least one registered person is extracted (YES in Step S206), the process goes to Step S208. If no registered person is extracted (NO in Step S206), the process goes to Step S218.

In Step S208, the similarity presence determining unit 30 determines whether any registered person extracted in Step S204 is similar to another registered person. In the present exemplary embodiment, if the flag in Step S110 is set for any registered person extracted in Step S204 (YES in Step S208), it is determined that any registered person extracted in Step S204 is similar to another registered person and the process goes to Step S210. If the flag in Step S110 is not set for all the registered persons extracted in Step S204 (NO in Step S208), the similarity presence determining unit 30 determines that no registered person extracted in Step S204 is similar to another registered person and the process goes to Step S214.

In Step S210, the identification information accepting unit 22 accepts input of the ID of the authentication target.

In Step S212, the second identifying unit 34 determines whether the ID accepted in Step S210 coincides with the ID of any registered person extracted in Step S204. If the registered person having the ID coinciding with the ID of any registered person extracted in Step S204 exists (YES in Step S212), the registered person is identified as the authentication target and the process goes to Step S216. If no registered person having the ID coinciding with the ID of any registered person extracted in Step S204 exists (NO in Step S212), the process goes to Step S218.

In Step S214, the first identifying unit 32 identifies the registered person having the highest degree of similarity with the authentication target, among the registered persons extracted in Step S204, as the authentication target and the process goes to Step S216.

In Step S216, the authentication apparatus 2 authenticates the authentication target as the registered person himself/herself identified in Step S212 or Step S214 and outputs the result of the authentication.

In Step S218, it is determined that the authentication target is not registered and an indication of the failure of the authentication is output.

Although the example in which the second identifying unit 34 identifies the authentication target on the basis of the identification information about the user, such as the ID of the user, is described in the above exemplary embodiments, the identification information is not limitedly used and information specific to the user may be used. For example, other biological information, such as the iris, the fingerprint, or the vein, different from the feature acquired by the feature acquiring unit 20 may be used. The other biological information is preferably capable of comparison with higher accuracy, compared with the comparison with the registered persons using the feature acquired by the feature acquiring unit 20. In this case, if the specific information acquired from the authentication target coincides with the specific information about any registered person extracted by the extracting unit 28, which is stored in the storage unit 36 in advance (including a case in which the difference between the pieces of specific information is lower than or equal to a predetermined threshold value), the second identifying unit 34 identifies the registered person having the coinciding specific information as the authentication target.

The threshold value TH1 used in the processing in the similarity-between-registered-persons determining unit 24 may be equal to or may be different from the threshold value TH2 used in the processing in the extracting unit 28 in the above exemplary embodiments. For example, it is supposed that the authentication of the user is more strongly affected by the surrounding environment (ambient light, the orientation of the face, etc.), compared with the registration of the user. When the variation factors in the acquisition of the feature of the user in the authentication of the user are greater than those in the registration of the user, the threshold value TH1 may be set to a value higher than that of the threshold value TH2.

Although the configuration in which the similarity-between-registered-persons determining unit 24 determines the similarity between the registered persons and stores the result of the determination in advance in the registration is described in the above exemplary embodiments, the determination of the similarity between the registered persons may be performed in the authentication.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication apparatus comprising:
at least one processor configured to implement:
- a feature acquiring unit configured to acquire a feature of at least part of a body of an authentication target;
- an extracting unit configured to compare a feature of at least part of a body of each registered person that is stored in advance with the feature acquired by the feature acquiring unit to extract one or more registered persons having degrees of similarity between the above features, based on a predetermined first threshold value;
- a determining unit configured to determine whether the feature of any of the extracted one or more registered persons has a degree of similarity with the feature of any registered person that is stored in advance, based on a predetermined second threshold value;
- a first identifying unit configured to identify, in response to the determination by the determining unit being negative, the registered person having the feature having a highest degree of similarity with the feature acquired by the feature acquiring unit, among the one or more registered persons extracted by the extracting unit, as the authentication target;
- a specific information accepting unit configured to accept information specific to the authentication target, different from the feature acquired by the feature acquiring unit; and
- a second identifying unit configured to identify, in response to the determination by the determining unit being affirmative and the information specific to the authentication target accepted by the specific information accepting unit coinciding with information that is specific to any registered person extracted by the extracting unit and that is stored in advance, the registered person having the coinciding specific information as the authentication target.

2. The authentication apparatus according to claim 1,
wherein the specific information accepting unit is configured to accept identification information about the authentication target, and
wherein, if the determination by the determining unit is affirmative and the identification information accepted by the specific information accepting unit coincides with identification information about any registered person extracted by the extracting unit, which is stored in advance, the second identifying unit is configured to identify the registered person having the coinciding identification information as the authentication target.

3. The authentication apparatus according to claim 1,
wherein the feature acquiring unit is configured to acquire the feature of a face.

4. The authentication apparatus according to claim 2,
wherein the feature acquiring unit is configured to acquire the feature of a face.

5. An authentication apparatus comprising:
at least one processor configured to implement:
- a specific information accepting unit configured to accept information specific to a user to be registered; and
- a feature acquiring unit configured to acquire a feature of at least part of a body of the user; and
a memory configured to store at least the information specific to the user and the feature of at least part of the body of the user,
wherein the at least one processor is further configured to implement a determining unit configured to determine, during a registration process, whether a degree of similarity between the feature acquired by the feature acquiring unit and a feature of any other user previously stored in the memory exceeds a predetermined threshold value, and
wherein the authentication apparatus further comprises a storage controller configured to control storage so that the information specific to the user accepted by the specific information accepting unit, the feature acquired by the feature acquiring unit, and information about the result of the determination by the determining unit are stored as registration information in the memory in association with each other.

6. An authentication apparatus comprising:
at least one processor configured to implement:
- a specific information accepting unit configured to accept information specific to a user; and
- a feature acquiring unit configured to acquire a feature of at least part of a body of the user; and
a memory configured to store at least the information specific to the user and the feature of at least part of the body of the user,
wherein the at least one processor is further configured to implement a first determining unit configured to determine whether a degree of similarity between the feature acquired by the feature acquiring unit and a feature of at least part of a body of any other user previously stored in the memory exceeds a predetermined first threshold value,
wherein the authentication apparatus further comprises a storage controller configured to control storage so that the information specific to the user accepted by the specific information accepting unit, the feature acquired by the feature acquiring unit, and information about the result of the determination by the first determining unit are stored as registration information in the memory in association with each other,
wherein the at least one processor is further configured to implement:
- an extracting unit configured to compare the feature of at least part of the body of each user previously stored in the memory with a feature of a user to be authenticated acquired by the feature acquiring unit to extract one or more users having the degrees of similarity between the above features, based on a predetermined second threshold value;
- a second determining unit configured to determine, based on the registration information, whether the degree of similarity between the feature of any of the extracted one or more users and the feature of any other user previously stored in the memory exceeds the predetermined first threshold value;
- a first identifying unit configured to identify, in response to the determination by the second determining unit being negative, the user having the feature having a highest degree of similarity with the feature of the user to be authenticated acquired by the feature acquiring unit, among the users extracted by the extracting unit, as an authentication target; and
- a second identifying unit configured to identify, in response to the determination by the second determining unit being affirmative and the information specific to the user to be authenticated accepted by the specific information accepting unit coinciding with information specific to any user extracted by the extracting unit, which is stored in the memory, the user having the coinciding specific information as the authentication target.

7. A non-transitory computer readable medium storing a program causing a computer to execute a process comprising:
acquiring a feature of at least part of a body of an authentication target;
comparing a feature of at least part of a body of each registered person that is stored in advance with the acquired feature to extract one or more registered persons having degrees of similarity between the above features, based on a predetermined first threshold value;
determining whether the feature of any of the extracted one or more registered persons has a degree of similarity with the feature of any registered person that is stored in advance, based on a predetermined second threshold value;
identifying, in response to the determination being negative, the registered person having the feature having a highest degree of similarity with the acquired feature, among the one or more extracted registered persons, as the authentication target;
accepting information specific to the authentication target, different from the feature of the authentication target; and
identifying, in response to the determination being affirmative and the accepted information specific to the authentication target coinciding with information specific to any extracted registered person, which is stored in advance, the registered person having the coinciding specific information as the authentication target.

8. An authentication method comprising:
acquiring a feature of at least part of a body of an authentication target;
comparing a feature of at least part of a body of each registered person that is stored in advance with the acquired feature to extract one or more registered persons having degrees of similarity between the above features, based on a predetermined first threshold value;
determining whether the feature of any of the extracted one or more registered persons has a degree of similarity with the feature of any registered person that is stored in advance, based on a predetermined second threshold value;
identifying, in response to the determination being negative, the registered person having the feature having a highest degree of similarity with the acquired feature, among the one or more extracted registered persons, as the authentication target;
accepting information specific to the authentication target, different from the acquired feature; and
identifying, in response to the determination being affirmative and the accepted information specific to the authentication target coinciding with the information that is specific to any extracted registered person and that is stored in advance, the registered person having the coinciding specific information as the authentication target.

9. An authentication method comprising:
accepting information specific to a user to be registered;
acquiring a feature of at least part of a body of the user;
storing at least the information specific to the user and the feature of at least part of the body of the user;
determining, during a registration process, whether a degree of similarity between the acquired feature and a feature of any other user that is previously stored exceeds a predetermined threshold value; and
controlling storage so that the accepted information specific to the user, the acquired feature, and information about the result of the determination are stored in association with each other as registration information.

10. An authentication method comprising:
accepting information specific to a user;
acquiring a feature of at least part of a body of the user;
storing at least the information specific to the user and the feature of at least part of the body of the user;
determining whether a degree of similarity between the acquired feature and a feature of at least part of a body of any other user that is previously stored exceeds a predetermined first threshold value;
controlling storage so that the accepted information specific to the user, the acquired feature, and information about the result of the determination are stored in association with each other as registration information;
comparing the feature of at least part of the body of each user which is previously stored with a feature of a user to be authenticated which is acquired to extract one or more users having the degrees of similarity between the above features, based on a predetermined second threshold value;
determining, based on the registration information, whether the degree of similarity between the feature of any of the extracted one or more users and the feature of any other user which is previously stored exceeds the predetermined first threshold value;
identifying, in response to the determination based on the registration information being negative, the user having the feature having a highest degree of similarity with the feature of the user to be authenticated which is acquired, among the users that are extracted, as an authentication target; and
identifying, in response to the determination based on the registration information being affirmative and information specific to the user to be authenticated coinciding with the information specific to any user which is extracted, which is stored, the user having the coinciding specific information as the authentication target.

11. The authentication apparatus of claim 1, wherein the predetermined first threshold value is higher than the predetermined second threshold value.

12. The authentication apparatus of claim 1, wherein the predetermined second threshold value is higher than the predetermined first threshold value.

13. An authentication apparatus comprising:
a processor;
memory storing executable instructions that, when executed by the processor, causes the processor to perform the steps of:
acquiring a feature of at least part of a body of an authentication target;
comparing a feature of at least part of a body of each registered person that is stored in advance with the acquired feature to extract one or more registered persons having degrees of similarity between the above features, based on a predetermined first threshold value;
determining whether the feature of any of the extracted one or more registered persons has a degree of similarity with the feature of any registered person that is stored in advance, based on a predetermined second threshold value;
identifying, in response to the determination being, negative, the registered person having the feature having a highest degree of similarity with the acquired feature, among the one or more extracted registered persons, as the authentication target;

accepting information specific to the authentication target, different from the feature of the authentication target; and identifying, in response to the determination being affirmative and the accepted information specific to the authentication target coinciding with information specific to any extracted registered person, which is stored in advance, the registered person having the coinciding specific information as the authentication target.

* * * * *